(12) United States Patent
Padaki et al.

(10) Patent No.: US 12,541,016 B1
(45) Date of Patent: Feb. 3, 2026

(54) PRESENCE-DETECTION MODES FOR DISPLAY DEVICES

(71) Applicant: Amazon Technologies, Inc., Seattle, WA (US)

(72) Inventors: Aditya V Padaki, San Jose, CA (US); Abhishek Sanaka, San Jose, CA (US); Raghunandan M Rao, Santa Clara, CA (US); Zheda Li, Mountain View, CA (US); Morris Yuanhsiang Hsu, Mountain View, CA (US); Fnu Rohit Kumar, San Jose, CA (US); Sai Prashanth Chinnapalli, Dublin, CA (US); Vivek Yenamandra, Santa Clara, CA (US); Niranjan Thontadarya, San Jose, CA (US); Maqsood Ahamed Abdul Careem, Sunnyvale, CA (US); Siddharth Sharma, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 18/210,570

(22) Filed: Jun. 15, 2023

(51) Int. Cl.
  *G01S 13/56* (2006.01)
  *G01S 7/41* (2006.01)
  *H04N 21/44* (2011.01)
  *H04N 21/442* (2011.01)
  *H04N 21/443* (2011.01)

(52) U.S. Cl.
  CPC .............. *G01S 13/56* (2013.01); *G01S 7/415* (2013.01); *H04N 21/44218* (2013.01); *H04N 21/4436* (2013.01)

(58) Field of Classification Search
  CPC .................. G01S 13/56; G01S 7/415
  See application file for complete search history.

(56) References Cited

U.S. PATENT DOCUMENTS

| | | | |
|---|---|---|---|
| 2011/0241928 A1* | 10/2011 | Oswald | G01S 13/87 342/90 |
| 2018/0364360 A1* | 12/2018 | Zellinger | G01S 17/10 |
| 2020/0341114 A1* | 10/2020 | Acharya | G01S 13/26 |
| 2021/0055386 A1* | 2/2021 | Rimini | G01S 13/343 |
| 2022/0295144 A1* | 9/2022 | Zhang | H04B 17/309 |

\* cited by examiner

Primary Examiner — William Kelleher
Assistant Examiner — Juliana Cross
(74) Attorney, Agent, or Firm — Nicholson De Vos Webster & Elliott LLP

(57) ABSTRACT

This disclosure describes, in part, techniques for using presence detection in order to switch between power modes of a device. The disclosure relates to detection of oscillating and rotating objects (or other repetitive motion objects) for rejection of radar returns related to the motion of such objects. Accordingly, the systems described herein provide for identifying radar returns as related to a repetitive motion object in proximity of the device. The radar returns can be processed to determine if related to a repetitive motion object such as a fan or a non-repetitive motion object such that the device can be controlled for presence detection based on actual presence and avoiding false presence detections due to repetitive motion and movement.

20 Claims, 8 Drawing Sheets

PRESENCE-DETECTION MODES FOR DISPLAY DEVICES

BACKGROUND

Display devices, such as televisions and computer monitors, use various techniques in order to conserve power. For example, a display device may require an interaction, such as a touch input from a user or a command from a control device, to initially be turned on. Next, if the user does not interact with the display device for a period of time, the display device may activate a screensaver. Additionally, if the user continues to not to interact with the display device for another period of time, the display device may automatically turn off. However, this may cause inconvenience for the user, such as when the user is utilizing the display device, but not directly interacting with the display device. For example, the user may be watching a movie or viewing a document on the display device without actually providing any inputs to the display device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
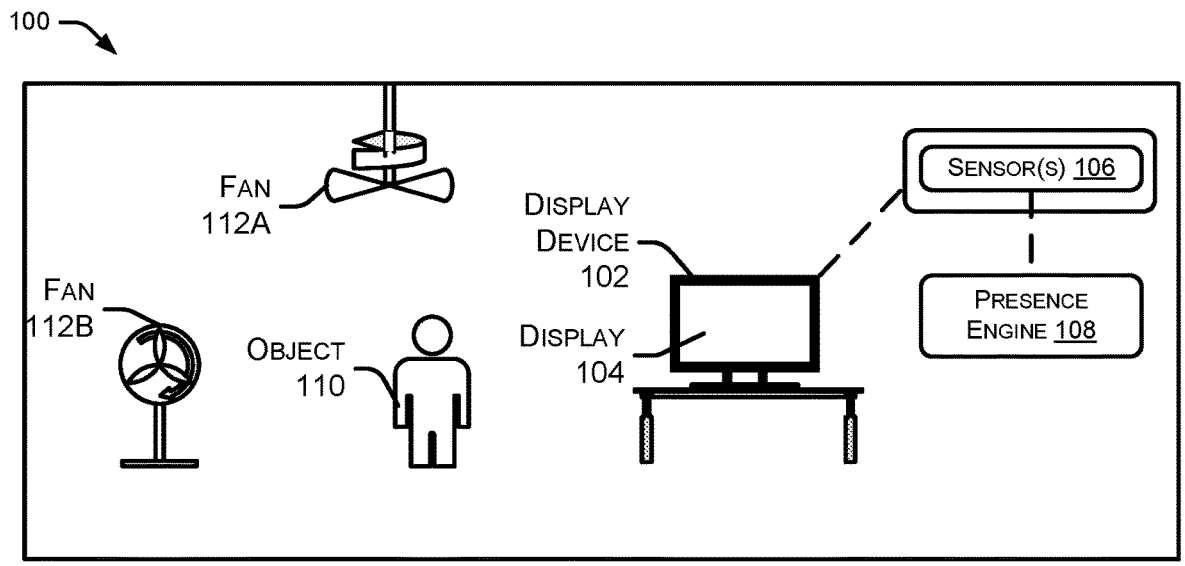
FIG. 1 illustrates an example scene and system for rejecting fan detections as part of a presence detection, in accordance with example of the present disclosure.
Figure 1:
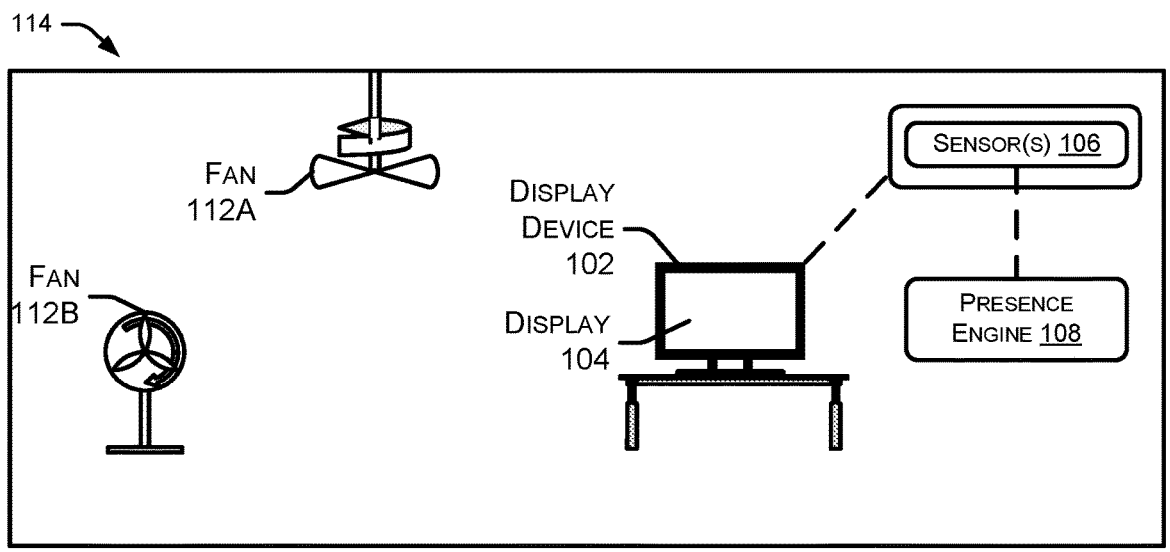

This disclosure describes, in part, techniques that use presence detection to operate a display device in various power modes and more particularly to reject false presence detections due to oscillating or rotating objects, such as fans. For instance, the display device may include a sensor, such as a radar sensor, that the display device uses to detect objects, such as a user. In some examples, the display device operates in a first presence-detection mode to initially detect an object. The display device may then operate in a second, different presence-detection mode that uses additional processing components in order to determine if the object is a valid object for presence detection or of the object is an oscillating or rotating target. Based on detecting the presence of the object, the display device may switch between different power modes in order to conserve power. For example, when the display device does not detect the presence of an object, the display device may operate in power modes in which one or more components, such as the display, are deactivated. However, when the display device does detect the presence of the object, the display device may operate in power modes in which the component(s) are activated and/or in which the display device provides specific types of content. By activating the component(s) when an object is detected and deactivating the component(s) when the object is no longer detected, the display device conserves power.

For more details, the display device may include the one or more sensors that the display device uses to detect objects. As described herein, the display device may include, but is not limited to, a television, a monitor, a mobile device, a computer, a laptop, a projector, and/or any other type of device that is able to provide content. Additionally, the sensor(s) may include, but are not limited to, radar sensor(s), lidar sensor(s), distance sensor(s), imaging device(s) (e.g., camera(s)), and/or any other type of sensor that the display device may use to detect objects. In some examples, the display device detects objects that are located within a threshold distance to the display device. The threshold distance may include, but is not limited to, one meter, five meters, ten meters, twenty meters, and/or any other distance. In some examples, the display device is preprogrammed with the threshold distance while, in other examples, a user may set the threshold distance for the display device.

In some examples, before detecting an object, the display device may operate in a first mode, which may be referred to as a "standby-passive mode." In the first mode, the display device may deactivate (e.g., turn off, cease providing power, etc.) a majority of the components of the display device, such as the display, the speaker(s), the microphone(s), and/or the like. Additionally, the display device may place the main host in a deep sleep mode, such as placing a system on chip (SoC) in the deep sleep mode, suspending the RAM, such as by placing the RAM in a minimum power state that is just sufficient to retain data, and/or the like. Furthermore, the display device may activate (e.g., turn on, provide power to, etc.) the sensor(s) that the display device uses to detect objects. By activating and deactivating such components in the first mode, the display device is able to conserve power while still being able to detect objects that are proximate to the display device.

In some examples, while operating in the first mode, the display device may further operate in a first presence-detection mode, which may be referred to as a "motion-detection mode." In the first presence-detection mode, the sensor(s) may generate sensor data and then analyze the sensor data to determine whether a possible object is detected, such as within the threshold distance of the display device. For instance, and in examples where the sensor(s) include radar sensor(s), the first presence-detection mode is used to detect whether there exists peak(s) above an adaptive threshold over the amplitude of samples. Detecting a peak that is above the adaptive threshold over the amplitude of samples may indicate the presence of a possible object. When the sensor(s) detect a possible object, the sensor(s)

may then send, to the main host of the display device, output data indicating the detection of the possible object.

Based on detecting the presence of a possible object (e.g., receiving the output data from the sensor(s)), the display device may then switch to operating in a second mode, which may be referred to as a "standby-active mode." In the second mode, the display device may activate one or more of the components that were deactivated while in the first mode. For example, the display device may activate the main host (e.g., the SoC), the microphone(s), and/or the like in response to receiving the output data from the sensor(s). In some examples, the display device activates the one or more components by providing power to the one or more components. However, the display device may cause at least the display to remain deactivated.

The systems and techniques herein provide for preventing false presence detection due to movement or motion from or as a result of repetitive motion objects including oscillating or rotating targets, such as fans, clocks, pendulums, and the like. The systems and techniques herein may use time series of radar signals, frequency domain signatures (e.g., from a Fast Fourier Transform (FFT)), and other such data to differentiate radar returns as a result of the oscillating or rotating objects from stationary or dynamic human targets. In a conventional presence detection system, the system may return a false positive when a fan or other such object is running within a room. The false positive may result in activation or operation in a second mode for a display device or other device even when no human presence is detected.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. For example, a display device such as a television may include a radar sensor configured to, while the television is operating in a standby-passive mode, generate sensor data, analyze the sensor data to detect a possible object, and determine that the possible object is located within a threshold distance to the television. The television also includes a display. The television also includes one or more processors and one or more computer-readable media storing instructions that, when executed by the one or more processors, cause the one or more processors to perform operations. The operations may include causing the television to operate in the standby-passive mode by at least deactivating the display, receiving, from the radar sensor, first output data indicating that the radar sensor detected the possible object. Further, based at least in part on receiving the first output data, the operations may include causing the television to operate in a standby-active mode by at least activating a processing component, and while the television is operating in the standby-active mode receiving second output data from the radar sensor, the second output data indicating at least a distance to the possible object, and analyzing, using the one or more processors, the second output data to determine that the possible object is a non-fan object. Further, based at least in part on determining that the possible object is a non-fan object, causing the television to operate in an ambient mode by at least activating the display, and causing the display to present a user interface.

In some examples, the techniques herein may include a method for rejecting fan detections for presence detection by a display device. The method includes causing a display device configured to operate in a first mode and a second mode based on presence detection of a person to operate in a first mode by at least deactivating a display of the display device. The method also includes while the display device is operating in the first mode, generating first sensor data using a sensor of the display device. The method also includes determining, based on the first sensor data and by a processing component associated with the sensor, a presence of an object. The method also includes outputting output data indicating that the object was detected. The method also includes generating second sensor data using the sensor. The method also includes determining, using the processing component, that the object may include a fan operating in proximity of the display device. The method also includes based at least in part on the object may include the fan, causing the display device to operate in the first mode. The method also includes causing the display device to operate in the second mode by at least activating the display in response to determining the object is a person. Other embodiments of this aspect include corresponding computer systems, apparatus, and computer programs recorded on one or more computer storage devices, each configured to perform the actions of the methods.

The systems and techniques herein may use a radar sensor, radar chipset, microcontroller, or processor of the display device to implement fan detection algorithms or techniques that enable rejection of such false positive detections, and thereby prevent the device from activating in response to the false positive returns from the radar. The system may perform signal processing based on a presence algorithm to generate a presence and/or absence status. The algorithm, which may be embodied in the kernel space and/or on other device or space within the system, enables low-latency and low power consumption for determining the presence indication (and rejecting false positives from fan returns). Throughout the description, reference may be made to oscillating, rotating, or other such objects including fans, ceiling fans, tower fans, and the like. The description and examples provided herein are intended to be applicable to any rotating, oscillating, or non-human objects that may return false positive radar returns to a presence detection system.

The presence detection and false positive rejection for fan detections receives input data from one or more sensors and performs logic to determine if a dynamic person, static person, fan, or no detection is within proximity of the display device. In particular, the system may receive distance peaks corresponding to distances to one or more (e.g., five or more) peak detections of objects as returned by a radar system. A first module may be configured to detect ingress into the sensing zone for the system, such as within a threshold distance, as discussed herein. A second module may be configured to detect static presence of a human after ingress, based on logic to transition from ingress to static presence detection. A third module may be configured to detect fans within the detection range of the system and return radar bins and/or locations that may be used to disregard or reject presence detections based on the detection of a fan or other such device.

The fan detection module may be implemented in a number of different ways or techniques that may include combinations of one or more of the following. The module may receive information from the sensor system, such as radar returns, and may output an indication of presence or non-presence in proximity of the display device while rejecting fan detections, thereby producing presence detections for only presence of users in proximity of the display device. In a first example, the system may use peak count accumulation in an array to detect fan presence. The peak count accumulation array may generate an array that keeps track of history (e.g., over time) for distances of five (or more or less) maximum peak returned at intervals over the time period. The array may be formed of a number of elements that correspond to a number of range bins, with the bins each corresponding to a range of distances for peak detections. As the number of peaks are accumulated in the array, by populating based on the distance of the determined peaks, the entries in the array are therefore a summation of peaks at each range. Subsequently, the number of bins with a summation or accumulated number of peak counts that exceed a first threshold may be evaluated, and if the number of bins exceeds a second threshold, then the system may output a determination of non-fan motion (e.g., indication of motion by a user or non-fan object). In some examples, the system may further perform a low-power peak count accumulation with the array. The low-power peak count may be an indication of peak values returned using a low-power detection system, such as low-power radar data. When a fan is detected, such as when the number of bins with peak counts above the first threshold is below the second threshold, then the system may identify the fan bins corresponding to the location of the fan and may reject or ignore radar detections while determining ingress or presence of a user in proximity of the display device.

In a second example the system may use peak count accumulation in a matrix to detect fan presence. The matrix may be similar to the array described above, except that the columns may correspond to range bins and the rows of the matrix correspond to frames or time intervals. Therefore, each row may be representative of radar data at a particular time. To detect fan or non-fan motion in the proximity of the display device, the system may sum peak counts in cells of the matrix over a predetermined number of frames (e.g., summing over a predetermined number of rows of the matrix). Similar to described above with respect to the array, the fan or non-fan motion may be detected based on the number of bins having peak counts above the first threshold. In this manner, the peak counts indicate motion across bins, as opposed to motion at a single bin location (indicative of an oscillatory or rotating motion of a fan) that can be used to detect non-fan motion. In some examples, the number of frames to evaluate over may be adjustable and/or selected based on additional factors.

In a third example the system may use doppler energy to detect fan presence. The radar data from the radar system may be conveyed to the system, which may determine peak values for the radar data, such as 5 maximum peak values. The peak values may be populated into a matrix with rows related to frames or radar chirps and columns related to range bins. Each range bin may correspond to a distance, as reported by a chipset of the radar system. The number of bins may be determined based on resolution and maximum distance for the radar system. The doppler energy may be used to disambiguate between static presence of the user without a running fan from an empty room with a running fan therein. The doppler energy may also be used for static detection of a user in a room that also includes a running fan.

Once the radar data is received, the maximum peaks from a time series of chirps or frames can be arranged in a matrix as described above. The system may then determine a Fourier Transform of the matrix, such as a Fast Fourier Transform ("FFT" as described herein). The transform may result in generating a matrix of range bins (columns) and rows for doppler frequencies. The aggregate energy in one or more of the range bins may be referred to herein as the doppler energy. The doppler bins of the transformed matrix may be evaluated based on limits of doppler energy for static human presence (that may be predetermined and/or known). Accordingly, a doppler energy spectrum ratio may be calculated based on a ratio of the sum of range bins having doppler energy above a first threshold to a sum of range bins having doppler energy less than a second threshold. The two thresholds may define the upper and lower bounds for doppler energy of a static person. If the ratio is above a threshold value, then a static human may be detected. If the ratio is less than the threshold, then a running fan may be detected within the proximity of the display device. The doppler energy method may be used on a subset of maximum peak detections (e.g., 5 maximum peaks) and/or on a set of all peak values from the radar detections.

In a fourth example the system may use time doppler statistics to detect fan presence. As described herein, radar data may be gathered and arranged into a matrix of range bins (columns) and frames (rows) and subsequently transformed according to the FFT. The subsequent range bins with doppler frequency rows may be gathered over a time period. The data gathered over time may be processed to determine covariance across doppler frequency, covariance across the range bins, two-dimensional covariance, or other such temporal metrics. In some examples, the range-doppler matrices over time may be processed by a classifier, either threshold or machine-learning based to output indications of presence including detection of a running fan, dynamic human, static human, or non-presence.

Further, if the display device ceases detecting the presence of the user and also ceases receiving interactions from the user, then the display device may again switch to different power modes. For example, if the display device ceases detecting the presence of the user and also ceases receiving interactions from the user for a threshold period of time (referred to, in some examples, as a "second threshold period of time"), then the display device may activate a screensaver. Additionally, if the display device continues to cease detecting the presence of the user and also continues to cease receiving interactions from the user for another threshold period of time, then the display device may switch to again operating in the first mode. Furthermore, if the display device continues to cease detecting the presence of the user and also continues to cease receiving interactions from the user for another threshold period of time, then the display device may switch to operating in the first mode and/or the first presence-detection mode. The display device may perform such processes in order to conserve power when users are not actively using the display device.

In some examples, the display device may switch between the power modes based on again detecting the presence of the user. For a first example, after activating the screensaver, the display device may again detect the presence of the user (and/or another user) and/or receive an interaction from the user before the second threshold period of time expires. In response, the display device may switch to operating in the first or second operating mode based on detection of the user (and/or another user) and/or receive an interaction from the user before the third threshold period of time expires.

While these examples describe switching between the power modes when the display device no longer detects the presence of the user, in other examples, the display device may perform one or more other processes for conserving power. For example, while displaying the content, the display device may again cease detecting the presence of the user for the second threshold period of time. In response, and instead of activating the screensaver, the display device may lower the brightness of the display.

By performing the processes described herein, the display device is able to switch between different power modes using presence detection in addition to normal interactions with a user. This may save power for the display device, such as by powering down different components based on no longer detecting the presence of the user. For example, the display device may operate in lower-power modes when the user walks away from the display device, but then automatically turn back on when the user returns. Additionally, this may improve the experience for the user, such as by remaining on (e.g., in the fourth power mode) even when the display device is no longer receiving interactions from the user. As described herein, the display device will remain on since the display device is still detecting the presence of the user as being proximate to the display device.

FIG. 1 illustrates an example scene and system for rejecting fan detections as part of a presence detection, in accordance with example of the present disclosure. In a first scene 100, a display device 102 is pictured in a space. The display device 102 may include a display 104 for presenting information to a user and a sensor(s) 106. The first scene 100 also includes a fan 112A and a fan 112B (collectively fan 112). The display device 102 and/or sensor(s) 106 may be in communication with and/or include a presence engine 108 that may be used to determine a presence of a user in proximity of the display device 102 and thereby control the display 104. For example, the display device 102 and/or display 104 may be controlled based on the presence engine 108 in response to data from the sensor(s) 106. For example, the presence engine 108 may use output data from the sensor(s) 106 to detect an object 110 (e.g., a user) and cause the display device 102 and/or display 104 to operate in one or more different operating modes. For example, the display device 102 and/or display 104 may operate in a first mode where the display 104 is in a sleep mode. In some examples, the display device 102 may also be off or in a power-saving mode until the sensor(s) 106 and presence engine 108 determine ingress or presence of the object 110. The display device 102 and/or display 104 may be operated in a second mode or other mode where one or more operations are enabled or operational—for example to display information on the display 104, present a screensaver display, or other such operations.

The display device 102 may include a host (e.g., a SoC), which includes one or more processor(s), communication interface(s), and memory. Further, the display device may include the sensor(s) 106, input/output interfaces, speakers, microphones, display 104, and power components. While the host may include the processor, the communication interface, and the memory, in other examples, the host may not include one or more of the components, but may be in communication with the components over a communication network. For example, the presence engine 108 may be implemented on a chipset (e.g., integrated circuit) associated with the sensor(s) 106, with a microcontroller connected to the sensor(s) 106 and/or the display device 102, and/or on a chipset of the display device 102.

The presence engine 108 is configured to perform the processes described herein in order to detect object(s), detect fan objects, reject fan detections, and determine presence information for controlling operational modes of the display device 102.

The sensor(s) 106 may include any type of sensor that the display device 102 is able to use to detect the presence of objects, such as users. For example, the sensor(s) may include radar sensor(s), lidar sensor(s), distance sensor(s), imaging device(s), and/or the like. An input/output interface (s) may include any physical interface that the display device 102 may use to send or receive data, such as an Inter-Integrated Circuit (I2C), a Serial Peripheral Interface bus (SPI), a Universal Serial Bus (USB) as promulgated by the USB Implementers Forum, and so forth. For example, the input/output interface(s) may include an interface for connecting a cable, such as when the display device 102 is a television. Additionally, the display 104 may include any type of display that is able to present content. For example, the display device 102 may include, but is not limited to, a liquid crystal display (LCD), a light-emitting diode (LED) display, a vacuum fluorescent display, an electroluminescent display, a plasma display, a projector, and/or the like.

The sensor(s) 106 may detect radar data related to the object 110 and/or fan 112. In conventional systems, the motion or oscillation of the fan 112 may result in radar returns to the sensor(s) 106 indicative of presence. However, the presence engine 108 is configured to determine the presence of a fan and disregard presence detections associated with the fan 112 and/or to detect non-fan presence detections and perform control of the display device 102 based on the non-fan object and/or presence detections.

For example, in a second scene 114, the object 110 is no longer present (either before or after being in proximity of the display device 102). In conventional systems equipped with presence detection, the fan 112 may result in a false positive presence detection that may cause the display device 102 and/or display 104 to operate in a second mode (e.g., to transition from a first mode such as a low power mode to a second mode that includes operations of one or more systems of the display device 102, such as the display 104. As presented herein, the presence engine 108 is configured to prevent false positives and thereby control operation of the display device 102 without interruption due to motion by the fan 112.

In some examples, before detecting an object 110, the display device 102 may operate in a first mode, which may be referred to a "standby-passive mode." In the first mode, the display device 102 may deactivate (e.g., turn off, cease providing power, etc.) a majority of the components of the display device 102, such as the display 104, the speaker(s), the microphone(s), and/or the like. Additionally, the display device 102 may place the main host in a deep sleep mode, such as placing a system on chip (SoC) in the deep sleep mode, suspending the RAM, such as by placing the RAM in a minimum power state that is just sufficient to retain data, and/or the like. Furthermore, the display device 102 may activate (e.g., turn on, provide power to, etc.) the sensor(s) 106 that the display device 102 uses to detect objects. By activating and deactivating such components in the first mode, the display device 102 is able to conserve power while still being able to detect objects that are proximate to the display device 102.

In some examples, while operating in the first mode, the display device 102 may further operate in a first presence-detection mode, which may be referred to as a "motion-detection mode." In the first presence-detection mode, the sensor(s) 106 may generate sensor data and then analyze (for example via the presence engine 108) the sensor data to determine whether a possible object is detected, such as within the threshold distance of the display device 102. For instance, and in examples where the sensor(s) 106 include radar sensor(s), the first presence-detection mode is used to detect whether there exists peak(s) above an adaptive threshold over the amplitude of samples. Detecting a peak that is above the adaptive threshold over the amplitude of samples may indicate the presence of a possible object. When the sensor(s) 106 detect a possible object, the sensor(s) 106 may then send, to the main host of the display device, output data indicating the detection of the possible object.

Based on detecting the presence of a possible object (e.g., receiving the output data from the sensor(s) 106), the display device 102 may then switch to operating in a second mode, which may be referred to as a "standby-active mode." In the second mode, the display device 102 may activate one or more of the components that were deactivated while in the first mode. For example, the display device 102 may activate the main host (e.g., the SoC), the microphone(s), and/or the like in response to receiving the output data from the sensor(s). In some examples, the display device 102 activates the one or more components by providing power to the one or more components. However, the display device 102 may cause at least the display to remain deactivated.

The systems and techniques herein provide for preventing false presence detection due to movement or motion from or as a result of oscillating or rotating targets, such as fan 112. The systems and techniques herein may use time series of radar signals, frequency domain signatures (e.g., from a Fast Fourier Transform (FFT)), and other such data to differentiate radar returns as a result of the oscillating or rotating objects from stationary or dynamic human targets. In a conventional presence detection system, the system may return a false positive when a fan 112 or other such object is running within a room. The false positive may result in activation or operation in a second mode for a display device or other device even when no human presence is detected.

Figure 2:
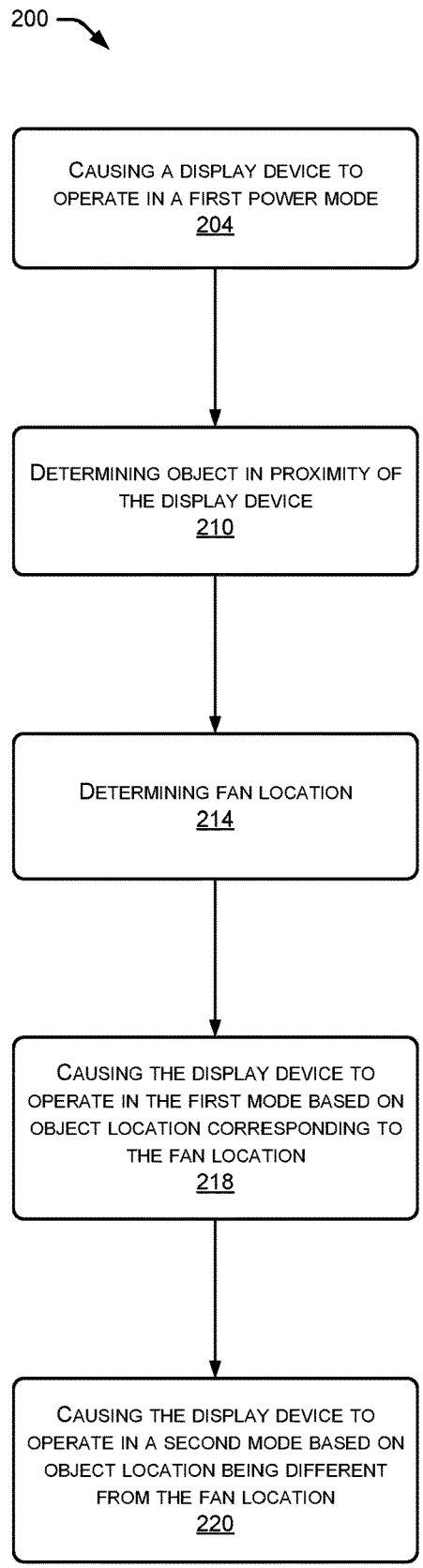
FIG. 2 illustrates an example process for using presence detection to switch between power modes of a display device, in accordance with examples of the present disclosure.
Figure 2:
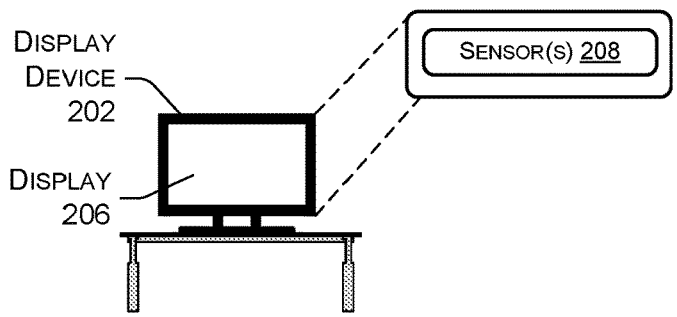
Figure 2:
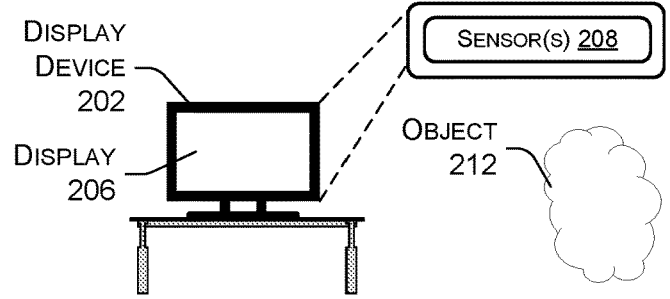
Figure 2:
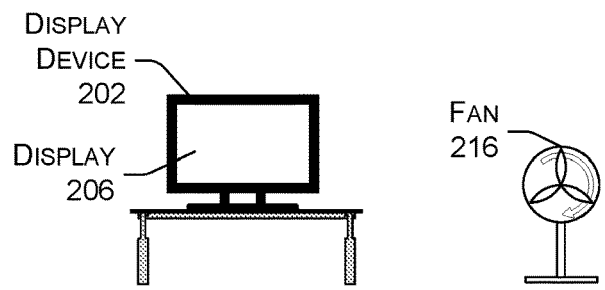
Figure 2:
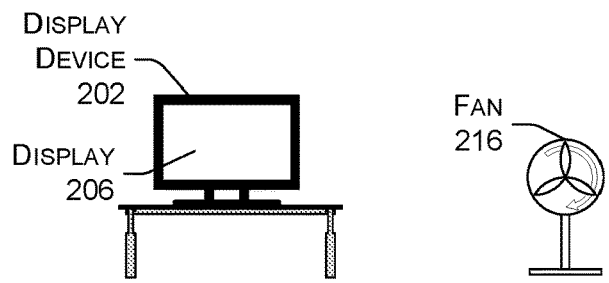
Figure 2:
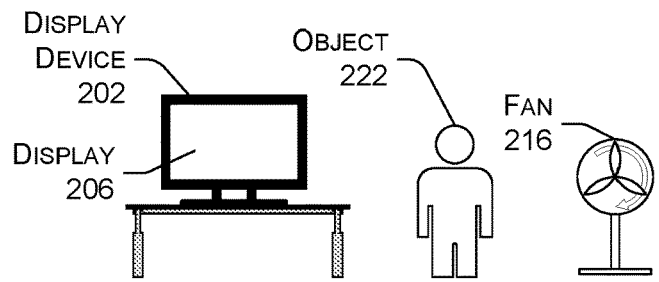

FIG. 2 illustrates an example process 200 for using presence detection to switch between modes of a display device 202, in accordance with examples of the present disclosure. Though described herein with respect to a display device, the techniques and systems herein may be implemented with any other suitable devices having multiple modes that may be switched based on presence detection. At 204, the process 200 may include causing a display device 202 to operate in a first mode. For instance, the display device 202 may initially operate in the first mode. As described herein, when operating in the first mode, the display device 202 may deactivate (e.g., turn off, cease providing power, etc.) a majority of the components of the display device 202, such as a display 206, speaker(s), microphone(s), and/or the like. Additionally, the display device 202 may place the main host in a deep sleep mode, such as placing a SoC in the deep sleep mode, suspending the RAM, such as by placing the RAM in a minimum power state that is just sufficient to retain data, and/or the like. In some examples, the first mode may include a first routine on the device and the second mode may include a second routine on the device. Furthermore, sensor(s) 208 of the display device 202 may remain activated in order to detect objects located proximate to the display device 202. The sensor(s) 208 may include, but are not limited to, radar sensor(s), lidar sensor(s), distance sensor(s), imaging device (s), and/or any other type of sensor 108 that the display device 202 may use to detect objects.

At 210, the process 200 may include determining an object in proximity of the display device 202. For instance, while operating in the first mode, the display device 202 may operate in a first presence-detection mode in which the sensor(s) 208 detect the presence of the object 212. Based on detecting the presence of the object 212, the display device 202 may switch from operating in the first mode to operating in the second mode. In the example of FIG. 2, the display device 202 switches to operating in the second mode by at least activating one or more components, such as a main host (e.g., the main SoC) and speaker(s). However, in other examples, the display device 202 may activate additional and/or alternative components. The display device 202 may further switch from operating in the first presence-detection mode to operating in a second presence-detection mode that the display device 202 uses to verify the object 212 is a non-fan object.

At 214, the process 200 may include determining a fan location. The fan 216 may be identified based on data from the sensor(s) 208, as described herein. For example, the process 200 may include receiving input data from the sensor(s) 208 and performing logic to determine if the object 212 is a dynamic person, static person, fan, or no detection is within proximity of the display device 202. In particular, a presence engine embodied on one or more components communicably coupled with the display device 202 may receive distance peaks corresponding to distances to one or more (e.g., five or more) peak detections of objects as returned by the sensor(s) 208. In some examples, determining the fan location may include a module configured to detect fans within the detection range of the sensor(s) 208 and return radar bins and/or fan locations that may be used to disregard or reject presence detections based on the detection of a fan or other such device.

The fan detection module may be implemented in a number of different ways or techniques that may include combinations of one or more of the following. The module may receive information from the sensor system, such as radar returns, and may output an indication of presence or non-presence in proximity of the display device while rejecting fan detections, thereby producing presence detections for only presence of users in proximity of the display device. In a first example, the system may use peak count accumulation in an array to detect fan presence. The peak count accumulation array may generate an array that keeps track of history (e.g., over time) for distances of five (or more or less) maximum peak returned at intervals over the time period. The array may be formed of a number of elements that correspond to a number of range bins, with the bins each corresponding to a range of distances for peak detections. As the number of peaks are accumulated in the array, by populating based on the distance of the determined peaks, the entries in the array are therefore a summation of peaks at each range. Subsequently, the number of bins with a summation or accumulated number of peak counts that exceed a first threshold may be evaluated, and if the number of bins exceeds a second threshold, then the system may output a determination of non-fan motion (e.g., indication of motion by a user or non-fan object). In some examples, the system may further perform a low-power peak count accumulation with the array. The low-power peak count may be an indication of peak values returned using a low-power detection system, such as low-power radar data. When a fan is detected, such as when the number of bins with peak counts above the first threshold is below the second threshold, then the system may identify the fan bins corresponding to the location of the fan and may reject or ignore radar detections while determining ingress or presence of a user in proximity of the display device.

In a second example the system may use peak count accumulation in a matrix to detect fan presence. The matrix may be similar to the array described above, except that the columns may correspond to range bins and the rows of the matrix correspond to frames or time intervals. Therefore, each row may be representative of radar data at a particular time. To detect fan or non-fan motion in the proximity of the display device, the system may sum peak counts in cells of the matrix over a predetermined number of frames (e.g., summing over a predetermined number of rows of the matrix). Similar to described above with respect to the array, the fan or non-fan motion may be detected based on the number of bins having peak counts above the first threshold. In this manner, the peak counts indicate motion across bins, as opposed to motion at a single bin location (indicative of an oscillatory or rotating motion of a fan) that can be used to detect non-fan motion. In some examples, the number of frames to evaluate over may be adjustable and/or selected based on additional factors.

In a third example the system may use doppler energy to detect fan presence. The radar data from the radar system may be conveyed to the system, which may determine peak values for the radar data, such as 5 maximum peak values. The peak values may be populated into a matrix with rows related to frames or radar chirps and columns related to range bins. Each range bin may correspond to a distance, as reported by a chipset of the radar system. The number of bins may be determined based on resolution and maximum distance for the radar system. The doppler energy may be used to disambiguate between static presence of the user without a running fan from an empty room with a running fan therein. The doppler energy may also be used for static detection of a user in a room that also includes a running fan.

Once the radar data is received, the maximum peaks from a time series of chirps or frames can be arranged in a matrix as described above. The system may then determine a Fourier Transform of the matrix, such as a Fast Fourier Transform ("FFT" as described herein). The transform may result in generating a matrix of range bins (columns) and rows for doppler frequencies. The aggregate energy in one or more of the range bins may be referred to herein as the doppler energy. The doppler bins of the transformed matrix may be evaluated based on limits of doppler energy for static human presence (that may be predetermined and/or known). Accordingly, a doppler energy spectrum ratio may be calculated based on a ratio of the sum of range bins having doppler energy above a first threshold to a sum of range bins having doppler energy less than a second threshold. The two thresholds may define the upper and lower bounds for doppler energy of a static person. If the ratio is above a threshold value, then a static human may be detected. If the ratio is less than the threshold, then a running fan may be detected within the proximity of the display device. The doppler energy method may be used on a subset of maximum peak detections (e.g., 5 maximum peaks) and/or on a set of all peak values from the radar detections.

In a fourth example the system may use time doppler statistics to detect fan presence. As described herein, radar data may be gathered and arranged into a matrix of range bins (columns) and frames (rows) and subsequently transformed according to the FFT. The subsequent range bins with doppler frequency rows may be gathered over a time period. The data gathered over time may be processed to determine covariance across doppler frequency, covariance across the range bins, two-dimensional covariance, or other such temporal metrics. In some examples, the range-doppler matrices over time may be processed by a classifier, either threshold or machine-learning based to output indications of presence including detection of a running fan, dynamic human, static human, or non-presence.

At 218, the process 200 may include causing the display device 202 to operate in the first mode based on the location of the object 212 corresponding to the fan location. The range bins detected by the sensor(s) 208 and corresponding to the fan 216 may be used to reject radar detections indicative of objects at the location of the range bins. Accordingly, the display device 202 may remain in the first mode in response to the location of the object 212 corresponding to the location of the fan 216.

At 220, the process 200 may include causing the display device 202 to operate in a second mode based on the object location being different from the fan location. For example, the object 222 may include a person positioned in proximity to the display device 202. Because the location of the object 222, as detected by the sensor(s) 208 will not correspond to the location of the fan 216, the object 222 may be detected and therefore used for causing the display device 202 to operate in the second mode. For instance, the display device 202 may verify that the object 212 is a person at object 222 while operating in the second presence-detection mode. As described in more detail below, and in some examples, the display device 202 may verify the object 212 based on detecting the presence of the object 212, within the threshold distance from the display device 202, for the first threshold period of time. Based on verifying the detection of the object 212 and that the object 212 is not the fan 216 but is related to a non-fan object, the display device 202 may then switch from operating in the first mode to operating in the second mode. In the example of FIG. 2, the display device 202 switches to operating in the second mode by at least activating one or more components, such as the display 206.

In some examples, the process 200 may include causing the display device 202 to again operate in the first mode based on no longer detecting the object 212 for a second threshold period of time. For instance, after switching to the second mode, the display device 202 may continue to analyze the sensor data generated by the sensor(s) 208 in order to detect the presence of the object 212 and/or another object. If the display device 202 still does not detect the presence of the object 212 and/or another object using the sensor data and/or receive an interaction, then the display device 202 may cause the counter to continue. Additionally, once the counter reaches the second threshold period of time without again detecting the object 212 and/or again receiving an interaction, then the display device 202 may switch from operating in the second mode to operating in the first mode.

Figure 3:
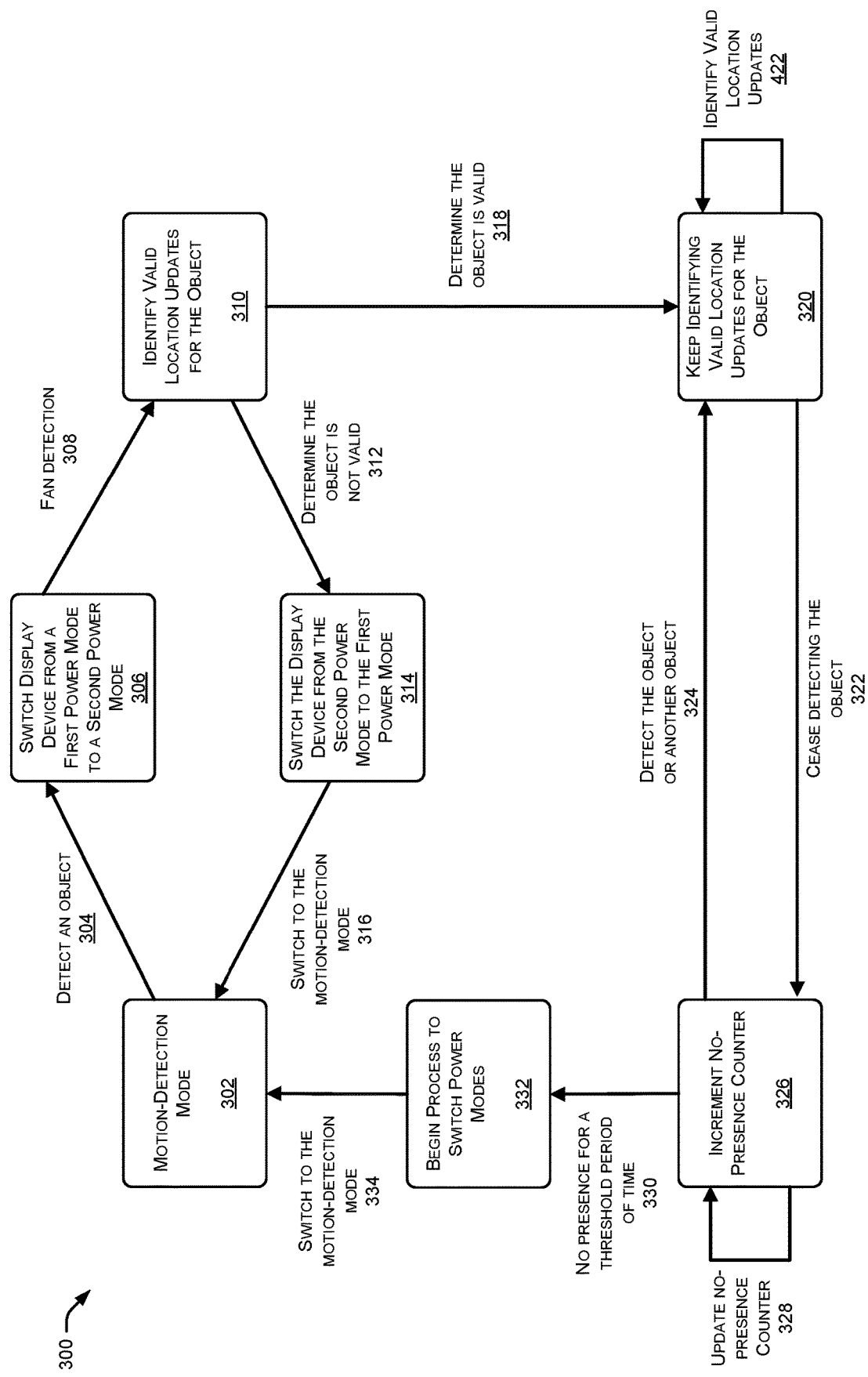
FIG. 3 illustrates an example of switching between different presence-detection modes, in accordance with examples of the present disclosure.

FIG. 3 illustrates an example of switching between different presence-detection modes, in accordance with examples of the present disclosure. In the example of FIG. 2, the display device may initially be operating in a motion-detection mode 302 (e.g., the first presence-detection mode described in examples herein). In some examples, in the motion-detection mode 302, the sensor(s) may internally generate sensor data and then analyze the sensor data to determine whether an object is detected. For example, such as when the sensor(s) include radar sensor(s), the radar sensor(s) may determine whether there exists peak(s) above an adaptive threshold over the amplitude of range samples, where each Fast Fourier Transformation (FFT) sample represents a range bin.

Figure 4A:
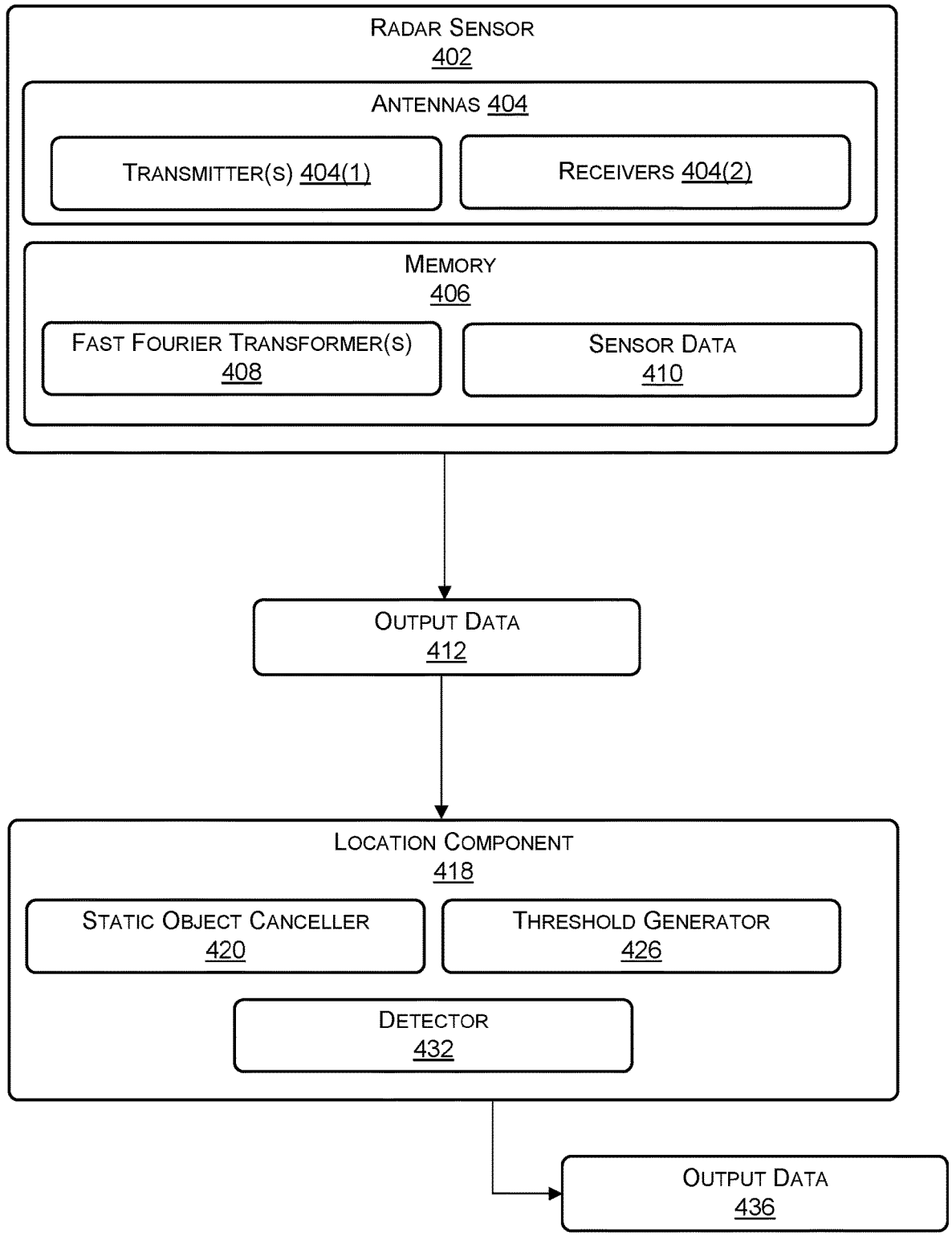
FIG. 4A illustrates an example architecture of a radar sensor, according to various examples of the present disclosure.

For example, FIG. 4A illustrates an example architecture of a radar sensor, according to various examples of the present disclosure. Referring to FIG. 4A, the location sensor includes a radar sensor 402 that includes antennas 404 and memory 406. The memory 406 includes at least one Fast Fourier Transformer(s) (FFT(s)) 408. While the example of FIG. 4A illustrates the transmitter(s) 404(1) as being separate from the receiver(s) 404(2), in other examples, the receiver(s) 404(2) may include the transmitters(s) 404(1).

Figure 4B:
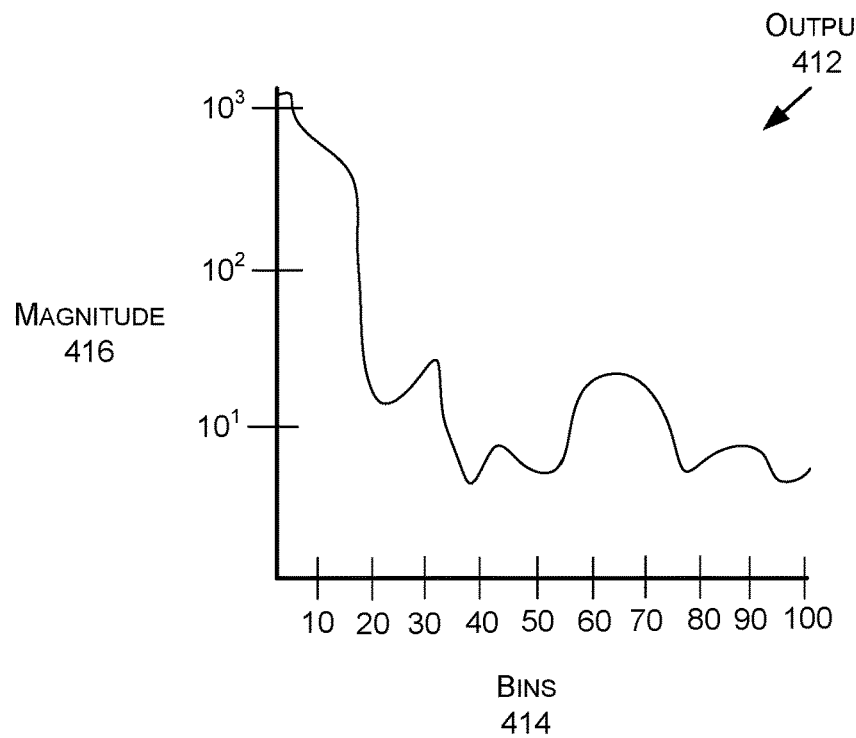
FIG. 4B illustrates an example of determining a distance to an object, according to various examples of the present disclosure.

In some examples, each frame output by the transmitter(s) 404(1) consists of a signal that represents a chirp. The transmitter(s) 404(1) output the signal, which is reflected off of at least one object, and then received by the receiver(s) 404(2), which generate sensor data 410 representing the signal. The sensor data 410 is then passed to the FFT(s) 408 for processing. For example, the FFT(s) 408 include one or more algorithms that are configured to convert a time domain and/or space domain from the signal to a representation in a frequency domain. The output is a measure of how strong the reflected signal is at a specific distance from the display device. In some examples, each frequency bin of the FTT(s) 408 corresponds to a physical distance away the display device. For example, and as illustrated in FIG. 4B, output data 412 representing a frame may include one hundred bins 414, where each bin 414 represents a distance (e.g., 22.5 centimeters) from the display device. However, the one hundred bins 414 is only an example, where other examples may include any number of bins which each represent any distance. The output data 412 further represents a magnitude 416 of the frequency of the signal at each of the bins 414. A location component 418 may then use the output data 412 to determine a distance of a possible object relative to the display device.

For example, since the output data 412 represents the magnitude 416 for all objects, a fan canceller 420 may be configured to subtract output data 412 representing a previous frame (and/or output data 412 representing more than one previous frame) from the current output data 412. Based on the subtraction, the static object canceller 420 may generate an output 422 that represents a magnitude 424 of dynamic objects and rejects or ignores static object detections. In some examples, a threshold generator 426 may then generate a threshold magnitude level 428 associated with detecting objects. In some examples, the threshold generator 426 generates the threshold magnitude level 428 using one or more algorithms, such as a constant false alarm rate (CFAR) algorithm. For instance, the threshold generator 426 may generate the threshold magnitude level 428 by taking the average of the magnitudes 430 detected by the radar sensor 402 over a period of time. The period of time may include, but is not limited to, one minute, five minutes, one hour, one day, and/or any other period of time. Additionally, or alternatively, in some examples, the threshold generator 426 generates the threshold magnitude level 428 by multiplying the average 430 of the magnitudes by a given multiplier. The multiplier may include, but is not limited to, 1.2, 1.5, 2, 3, and/or any other multiplier.

For example, the threshold generator 426 may perform an exponential average over the observed range of FFT measurements using the following equation:

$$y(n) = ay(n-1) + (1-\alpha)x(n) \quad (1)$$

In equation (1), x(n) is the range-FTT vector of the n-th chirp, y(n) is the averaged results following the above equation. As such, the frequency-dependent threshold may be determined by the following equation:

$$T(n) = y(n) + \text{motion\_threshold [dB]}$$

In the motion-detection mode 402, a proper setting for α may be set. Specifically, y(n) may be interpreted as the frequency-dependent noise evaluation at the n-th chirp.

A detector 432 may then analyze the output 422 in order to identify at least one peak magnitude that satisfies the threshold magnitude level 428. For example, and in the example of FIG. 4B, the detector 432 may identify a peak magnitude 434 around bin 414 third-two that satisfies the threshold magnitude level 428. Based on identifying the peak magnitude 434, the detector 432 may detect a possible object. Additionally, the detector 432 may analyze the output 422 to determine a distance to the possible object. In some examples, the detector 432 may determine the distance by multiplying the bin 414 for which the peak magnitude 434 was detected by the distance associated with each bin 414. For instance, and in the example of FIG. 4B, the detector 432 may determine that the distance is 720 centimeters (e.g., 32×22.5).

Additionally, in some examples, the location component 418 may determine an angle to the possible object. For example, the detector 432 may use the one or more algorithms, along with the horizontal-separation between the receivers 404(2), to convert the time domain from the signal to output phase information for determining the angle. For example, assume that a complex vector for a first receiver channel is $C_1$ and that a complex vector for a second receiver channel is $C_2$. The detector 432 may then determine a complex conjugate Y as (conjugate($C_1$)×$C_2$) and a phase difference P is derived as (atan 2(imag(Y), real(Y)). In some examples, the detector 432 may determine a moving average of the phase difference.

The detector 432 may then convert the phase difference P to the angle A using the following equation:

$$A = \sin^{-1}\left(\frac{W(P)}{2\pi d}\right) \quad (4)$$

In equation (4), w is the wavelength and d is the distance between the antennas 404 (. While this is just one example of how to determine the angle, in other examples, the detector may use additional and/or alternative techniques.

The detector 432 may then generate output data 436 indicating that the possible object that was detected, the distance to the possible object, the angle to the possible object, the peak magnitude associated with the possible object, and/or the like. In some examples, the detector 432 may perform these processes in order to generate output data 436 representing more than one object. For example, the output data 436 may represent the distances, the angles, and the peak magnitudes for two objects, five objects, ten objects, and/or the like. In some examples, the output data 436 is sent to the main host of the display device.

While the example of FIG. 4A illustrates the location component 418 as being separate from the radar sensor 402, in other examples, the location component 418 may be included as part of the radar sensor 402.

Returning to FIG. 3, if the sensor(s) detect an object while the display device is operating in the motion-detection mode 302, the sensor(s) may send output data indicating that the object is detected, such as output data 436, which is represented by 304. In response, the display device may perform the processes described herein in order to switch from operating in a first mode to operating in a second mode 306. For example, the display device may switch from operating in the standby-passive mode to operating in the standby-active mode. Additionally, the display device may perform fan detection 308 to determine if the object is a fan or non-fan object for controlling the display device.

For example, the sensor(s) may continue to send the output data 436, such as data that represents each frame. In some examples, as described above, the output data 436 may represent at least distance(s) to detected object(s), peak power(s) associated with the detected object(s), angle(s)

relative to the display device for the detected object(s), and/or any other information. The display device may then use this data to attempt to identify valid location updates for a valid object and to reject detections for non-valid objects such as fan objects or other such objects.

Referring back to FIG. 3, if the display device determines that the object is not valid 312 (e.g., if the object is determined to be a fan or other such rotating or oscillating object), then the display device may switch from operating in the second mode to operating in the first mode 314. For example, the display device may switch from operating in the standby-active mode to operating in the standby-passive mode.

However, if the display device determines that the object is valid 318 (e.g., a non-fan object), then the display device may continue to identify valid location updates for the object 320. For example, and at 322, the display device may continue to receive output data 436 from the sensor(s). The display device may then continue to perform the processes above, using the output data 436, in order to identify the valid location updates for the target associated with the object. As long as the display device keeps determining that there are valid location updates for the target, then the display device may determine that the object is still within the threshold distance to the display device. Additionally, based on determining that the object is valid, and while identifying the valid location updates, the display device may also switch to operating in a new power mode.

However, if the display device ceases detecting the object 324, then the display device may begin to increment a no-presence counter 326. For instance, if the display device determines that there are no valid location updates for any of the target(s) using the output data 436 from the sensor(s), then the display device may determine that there are no users within the threshold distance to the display device. As such, the display device may start to increment the no-presence counter. Additionally, while the no-presence counter is incrementing, the display device may continue to receive the output data 436 from the sensor(s) in order to determine if there is a new valid target. If the display device identifies a new valid target using the output data 436, then the display device may again detect the object or detect another object 324. As such, the display device may again begin to identify valid location updates for that object 320. However, if the display device does not identify new valid target, then the display device may continue to update the no-presence counter 328.

If the display device determines that there is no presence for a threshold period of time 330 using the no-presence counter, then the display device may begin to switch power modes 332. For a first example, if the display device does not detect a presence of an object for the second threshold period of time, then the display device may switch to a screensaver mode, low-power mode, or other standby mode. In some examples, if the display device continues to not detect a presence of an object for a threshold period of time, then the display device may switch to the standby-passive mode.

Figure 5:
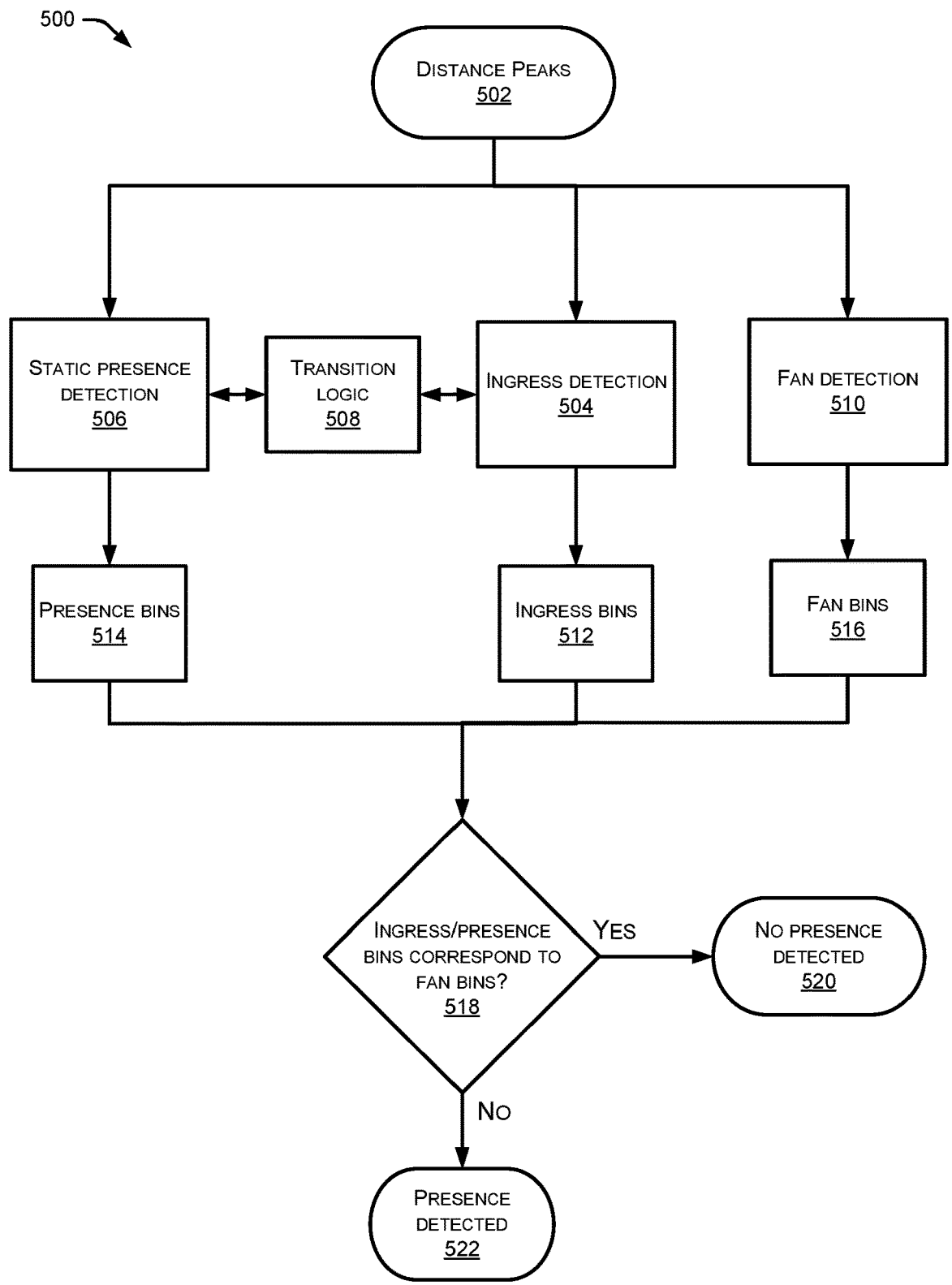
FIG. 5 illustrates an example process for determining presence in proximity to a device while rejecting detections of fans, in accordance with examples of the present disclosure.
Figure 6:
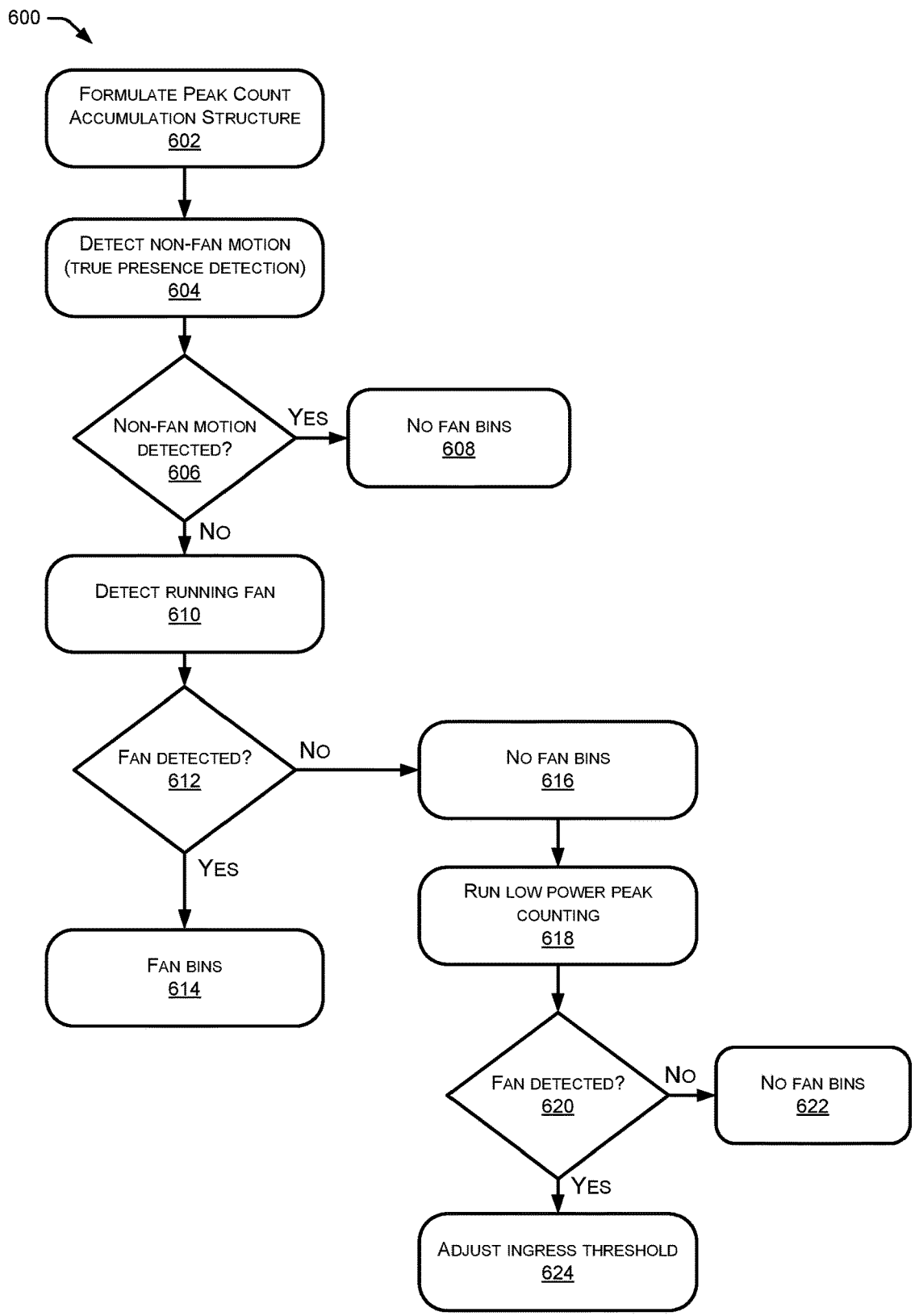
FIG. 6 illustrates an example process for determining fan detections by a presence sensing system, in accordance with examples of the present disclosure.
Figure 7:
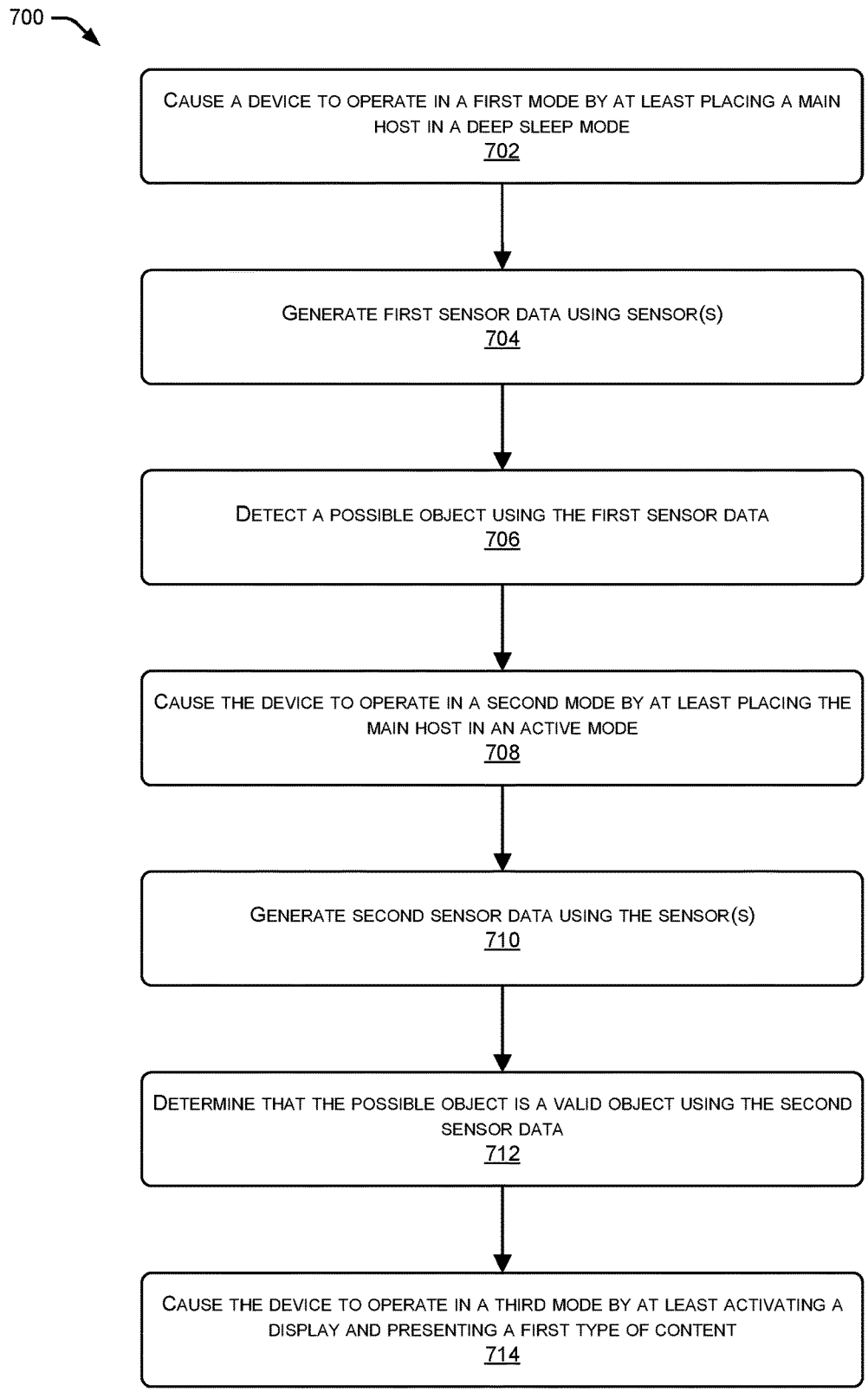
FIG. 7 illustrates an example process for operating a display device in various power modes based on presence detection, in accordance with examples of the present disclosure.

FIGS. 5-7 illustrate various processes for performing presence-detection modes for display devices. The processes described herein are illustrated as collections of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 5 illustrates an example process 500 for determining presence in proximity to a device while rejecting detections of fans, in accordance with examples of the present disclosure. The process 500 may begin with receiving distance peaks from sensors associated with the display device, such as radar data described with respect to FIG. 4B. The distance peaks may include peak detections at particular distances from the sensor and/or display device. At 504, ingress detection may be performed using an ingress detection algorithm based on radar data received from the sensor. For example, the ingress detection may include identifying objects that cross a threshold distance from the display device. The ingress detection 504 may be used to produce range bins 512 corresponding to a location of an object associated with the ingress. Further, a static presence detection and transition logic may be used to identify objects that ingress and subsequently remain stationary in range of the sensors and produce presence bins 514 for the stationary object. The transition logic 508 may include detection and determination of when a dynamic object becomes a stationary object in range of the sensors.

At 510, the process 500 includes performing fan detection to determine fan bins 516 identifying radar range bins associated with a fan object such that the fan bins can be excluded and rejected from further logic to determine presence. The process 500 may receive the identification of ingress bins 512, presence bins 514, and fan bins 516 and determine, at 518, if the ingress and/or presence bins correspond to the fan bins 516. In the event that the fan bins 516 do correspond, then no presence is detected at 520 by the process 500 and the detections at the bins can be rejected for presence detection. In the event that the fan bins 516 do not correspond to the ingress and/or presence bins, then the process may determine, at 522, that presence is detected in range of the display device.

The fan detection 510 may include receiving the radar data and/or the distance peaks from 502 and may output the fan bins 516 related to an indication of presence or non-presence in proximity of the display device while rejecting fan detections. In an example, the system may use peak count accumulation in an array to detect fan presence. The peak count accumulation array may generate an array that keeps track of history (e.g., over time) for distances of five (or more or less) maximum peak returned at intervals over the time period. The array may be formed of a number of elements that correspond to a number of range bins, with the bins each corresponding to a range of distances for peak detections. As the number of peaks are accumulated in the array, by populating based on the distance of the determined peaks, the entries in the array are therefore a summation of peaks at each range. Subsequently, the number of bins with a summation or accumulated number of peak counts that exceed a first threshold may be evaluated, and if the number of bins exceeds a second threshold, then the system may output a determination of non-fan motion (e.g., indication of motion by a user or non-fan object). In some examples, the system may further perform a low-power peak count accumulation with the array. The low-power peak count may be an indication of peak values returned using a low-power detection system, such as low-power radar data. When a fan is detected, such as when the number of bins with peak counts above the first threshold is below the second threshold, then the system may identify the fan bins corresponding to the location of the fan and may reject or ignore radar detections while determining ingress or presence of a user in proximity of the display device.

In another example the system may use peak count accumulation in a matrix to detect fan presence. The matrix may be similar to the array described above, except that the columns may correspond to range bins and the rows of the matrix correspond to frames or time intervals. Therefore, each row may be representative of radar data at a particular time. To detect fan or non-fan motion in the proximity of the display device, the system may sum peak counts in cells of the matrix over a predetermined number of frames (e.g., summing over a predetermined number of rows of the matrix). Similar to described above with respect to the array, the fan or non-fan motion may be detected based on the number of bins having peak counts above the first threshold. In this manner, the peak counts indicate motion across bins, as opposed to motion at a single bin location (indicative of an oscillatory or rotating motion of a fan) that can be used to detect non-fan motion. In some examples, the number of frames to evaluate over may be adjustable and/or selected based on additional factors.

In another example the system may use doppler energy to detect fan presence. The radar data from the radar system may be conveyed to the system, which may determine peak values for the radar data, such as 5 maximum peak values. The peak values may be populated into a matrix with rows related to frames or radar chirps and columns related to range bins. Each range bin may correspond to a distance, as reported by a chipset of the radar system. The number of bins may be determined based on resolution and maximum distance for the radar system. The doppler energy may be used to disambiguate between static presence of the user without a running fan from an empty room with a running fan therein. The doppler energy may also be used for static detection of a user in a room that also includes a running fan.

Once the radar data is received, the maximum peaks from a time series of chirps or frames can be arranged in a matrix as described above. The system may then determine a Fourier Transform of the matrix, such as a Fast Fourier Transform ("FFT" as described herein). The transform may result in generating a matrix of range bins (columns) and rows for doppler frequencies. The aggregate energy in one or more of the range bins may be referred to herein as the doppler energy. The doppler bins of the transformed matrix may be evaluated based on limits of doppler energy for static human presence (that may be predetermined and/or known). Accordingly, a doppler energy spectrum ratio may be calculated based on a ratio of the sum of range bins having doppler energy above a first threshold to a sum of range bins having doppler energy less than a second threshold. The two thresholds may define the upper and lower bounds for doppler energy of a static person. If the ratio is above a threshold value, then a static human may be detected. If the ratio is less than the threshold, then a running fan may be detected within the proximity of the display device. The doppler energy method may be used on a subset of maximum peak detections (e.g., 5 maximum peaks) and/or on a set of all peak values from the radar detections.

In another example the system may use time doppler statistics to detect fan presence. As described herein, radar data may be gathered and arranged into a matrix of range bins (columns) and frames (rows) and subsequently transformed according to the FFT. The subsequent range bins with doppler frequency rows may be gathered over a time period. The data gathered over time may be processed to determine covariance across doppler frequency, covariance across the range bins, two-dimensional covariance, or other such temporal metrics. In some examples, the range-doppler matrices over time may be processed by a classifier, either threshold or machine-learning based to output indications of presence including detection of a running fan, dynamic human, static human, or non-presence.

FIG. 6 illustrates an example process 600 for determining fan detections by a presence sensing system, in accordance with examples of the present disclosure. The process 600 can initiate at 602 by formulating a peak count accumulation data structure. The data structure may include an array or a matrix data structure for storing data related to peak counts from maximum radar peaks.

At 604, the process 600 includes detecting non-fan motion (e.g., detecting ingress presence). The non-fan motion can be identified based on detecting an object that traverses across a distance as detected by the radar data. In the event that non-fan motion is detected, at 606, then the process 600 can return an indication of no fan bins at 608, such that the bins associated with the non-fan motion can be used for altering operation of the display device based on detected presence.

In the event that no non-fan motion is detected, e.g., no ingress is detected, then the process 600 proceeds to 610 where the process will perform running fan detection. The fan detection may be performed as described herein, for example as described with respect to fan detection 510 or other fan detection herein. At 612, the process includes determining if a fan is detected. In the event that a fan is detected, as described herein, then the process 600 includes returning and/or outputting the fan bins at 614.

Figure 4B:
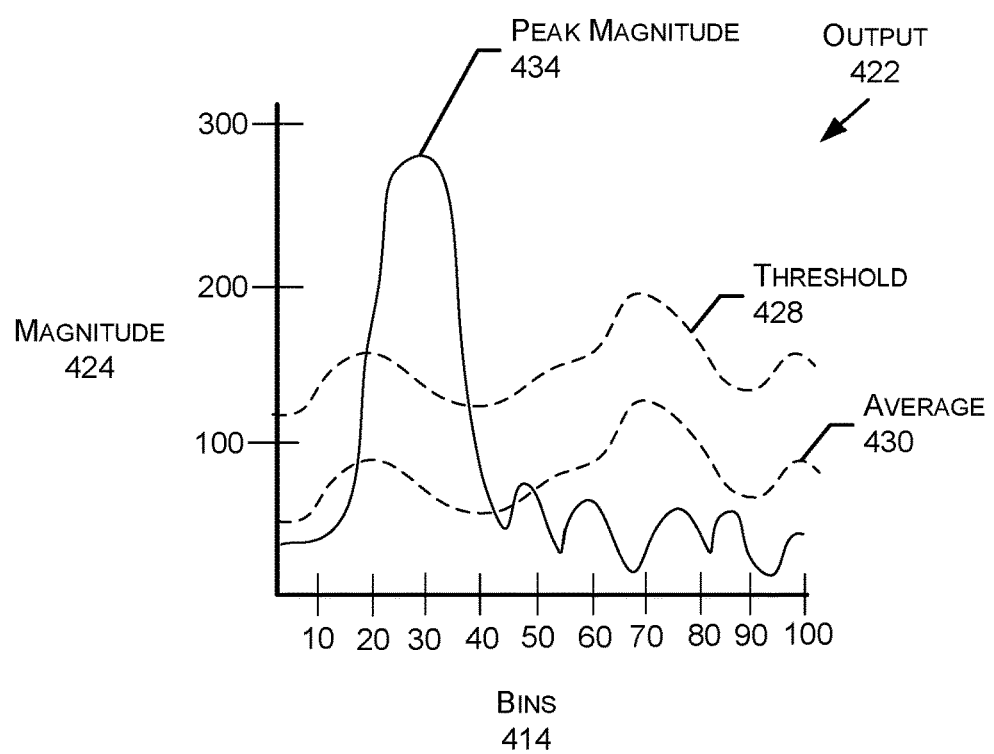

In the event that no fan bins are determined, at 616, then the process 600 may perform a low-power peak counting at 618. The low-power peak counting may use a more sensitive receiver than a long-distance radar system. A low-noise amplifier can be used to receive the low-power return signal. The additional low-power detection can be processed in a similar manner to the radar data from the peak count accumulation data at 602. In the event that no fan is detected at 620, then no fan bins are returns at 622. In the event that the low-power peak detection results in fan bin detections at 620, then the ingress threshold 624 may be lowered or otherwise adjusted accordingly. For instance, the threshold 428 of FIG. 4 may be lowered to a lower threshold that is below the threshold 428, such as a threshold near to average 430.

FIG. 7 illustrates an example process for operating a device is various modes based on presence detection, in accordance with examples of the present disclosure. At 702, the process 700 may include causing a device to operate in a first mode by at least placing a main host in a deep sleep mode. For instance, the device may operate in the first mode, which may include a standby-passive mode. While operating in the first mode, the device may cause the main host to operate in the deep sleep mode. Additionally, the device may cause one or more other components to deactivate, such as the speaker(s), the microphone(s), the display, and/or the like. However, the device may still activate the sensor(s) that the device uses to detect the presence of objects. Additionally, the device may operate in a first presence-detection mode, such as a motion-detection mode.

At 704, the process 700 may include generating first sensor data using the sensor(s) and at 706, the process 7900 may include detecting a possible object using the first sensor data. For instance, the sensor(s) of the device may generate the first sensor data. Since the device is operating in the first mode (e.g., the main host is in the deep sleep mode) and the device is operating in the first presence-detection mode, the sensor(s) may then analyze the sensor data in order to detect the presence of the possible object. For example, such as when the sensor(s) include radar sensor(s), the radar sensor(s) may identify a peak magnitude that satisfies a threshold.

At 708, the process 700 may include causing the device to operate in a second mode by at least placing the main host in an active mode. For instance, based on detecting the presence of the possible object, the display device may begin to operate in the second mode, which may include a standby-active mode, by activating the main host. In some examples, the main host activates based on receiving output data from the sensor(s), where the output data indicates the presence of the possible object. The device may also activate one or more other components, such as the microphone(s). In some examples, the second mode may be an optional mode that the device may transition through while performing process 700. In some examples, the device may transition from the first mode to the third mode, described below, based on determining that the object is a valid object.

At 710, the process 700 may include generating second sensor data using the sensor(s) and at 712, the process 700 may include determining that the possible object is a valid object using the second sensor data. For instance, the device may generate the second sensor data using the sensor(s). In some examples, since the device is operating in the second mode in which the main host is activate, the device may then use the main host to analyze the sensor data in order to determine that the possible object is an action object and/or a non-fan object (e.g., determine that the object is valid and not a repetitive motion object). In some examples, the device may determine that the possible object is a non-fan object based on detecting the possible object entering into a threshold zone over a first threshold period of time At 714, the process 700 may include causing the device to operate in a third mode by at least activating a function of the device and presenting a first type of content. For instance, based on determining that the possible object is the actual object, the device may operate in an additional mode, which may include an ambient mode. As such, the device may activate at least the function so that the device may present the content using the display. As mentioned above, the process 700 may be performed to transition from the first mode to the second mode wither with or without intermediate modes or steps (e.g., second mode) as described above.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer system(s). Thus, although certain steps have been described as being performed by certain devices, software programs, processes, or entities, this need not be the case, and a variety of alternative examples will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method comprising:
   causing a device configured to operate in a first mode and a second mode based on presence detection of a person to operate in a first mode by at least deactivating a function of the device;
   while the device is operating in the first mode, generating first sensor data using a sensor of the device;
   determining, based on the first sensor data and by a processing component associated with the sensor, a presence of a moving object;
   outputting output data indicating that the moving object was detected;
   generating second sensor data using the sensor;
   determining, using the processing component, that the moving object comprises a repetitive motion object operating in proximity of the device by:
      determining an array including a predetermined number of maximum peaks of the first sensor data and the second sensor data;
      computing a Fourier transform of the array;
      defining limits of doppler bins corresponding to doppler energy of a presence of a person;
      determining a doppler energy spectrum ratio based on the Fourier transform of the array and the limits; and
      determining that the moving object comprises the repetitive motion object in response to the doppler energy spectrum ratio being below a threshold;

based at least in part on the moving object comprising the repetitive motion object, causing the device to operate in the first mode; and causing the device to operate in the second mode by at least activating the function in response to determining the moving object is a person.

2. The method of claim 1, wherein the first sensor data comprises radar data and the second sensor data comprises radar data.

3. The method of claim 1, wherein determining that the moving object comprises the repetitive motion object further comprises:

determining a data structure populated with distance data over a period of time, the distance data determined based on peaks observed from the second sensor data, wherein the data structure comprises bins representing distance ranges;

populating the data structure using the second sensor data by inputting data associated with peak detections from the second sensor data in corresponding bins based on distance ranges;

determining a number of bins containing more than a first threshold for a number of peak detections; and determining the moving object comprises the repetitive motion object based on the number of bins being below a threshold number of bins.

4. The method of claim 3, wherein:

the data structure comprises an array for storing a history of distance data over time for the peak detections; and populating the array comprises incrementing a counter for the bins based on first peak detections from the first sensor data and second peak detections from the second peak detections.

5. The method of claim 3, wherein:

the data structure comprises a matrix with columns representing the bins and rows representing peak detections over time intervals; and determining the number of bins containing more than the first threshold comprises summing the peak detections across the time intervals represented by the rows.

6. The method of claim 1, further comprising:

while the device is operating in the second mode, generating third sensor data using the sensor;

determining, using the processing component and based at least in part on the third sensor data, that the person is no longer located proximate to the device for a first threshold period of time; and based at least in part on the person no longer being located proximate to the device for the first threshold period of time, causing the device to again operate in the first mode by deactivating the function.

7. The method of claim 1, further comprising determining a set of range doppler maps over a period of time based on the first sensor data and the second sensor data; and providing the set of range doppler maps to a machine learning classifier trained to produce an output indicative of presence of a running fan, dynamic human presence, static human presence, or no presence, and wherein determining the moving object comprises the repetitive motion object is further based on the output.

8. The method of claim 1, wherein determining the presence of the moving object comprises:

analyzing the first sensor data using a presence-detection technique by:

analyzing, by the sensor, the first sensor data to determine a magnitude of a frequency associated with a signal;

determining, by the sensor, a peak magnitude associated with the magnitude; and determining, by the sensor, that the peak magnitude satisfies a threshold magnitude; and determining the presence of the moving object comprises detecting, by the sensor, the moving object based at least in part on the peak magnitude satisfying the threshold magnitude.

9. A system comprising:

one or more processors; and one or more computer-readable media storing instructions that, when executed by the one or more processors, cause the one or more processors to perform operations comprising:

causing a device configured to operate in a first mode and a second mode based on presence detection of a person to operate in a first mode by at least deactivating a function of the device;

while the device is operating in the first mode, generating first sensor data using a sensor of the device;

determining, based on the first sensor data and by a processing component associated with the sensor, a presence of a moving object;

outputting output data indicating that the moving object was detected;

generating second sensor data using the sensor;

determining, using the processing component, that the moving object comprises a repetitive motion object operating in proximity of the device by:

determining an array including a predetermined number of maximum peaks of the first sensor data and the second sensor data;

computing a Fourier transform of the array;

defining limits of doppler bins corresponding to doppler energy of a presence of a person;

determining a doppler energy spectrum ratio based on the Fourier transform of the array and the limits; and determining that the moving object comprises the repetitive motion object in response to the doppler energy spectrum ratio being below a threshold;

based at least in part on the moving object comprising the repetitive motion object, causing the device to operate in the first mode; and causing the device to operate in the second mode by at least activating the function in response to determining the moving object is a person.

10. The system of claim 9, wherein determining that the moving object comprises a repetitive motion object further comprises:

determining a data structure populated with distance data over a period of time, the distance data determined based on peaks observed from the second sensor data, wherein the data structure comprises bins representing distance ranges;

populating the data structure using the second sensor data by inputting data associated with peak detections from the second sensor data in corresponding bins based on distance ranges;

determining a number of bins containing more than a first threshold for a number of peak detections; and determining the moving object comprises the repetitive motion object based on the number of bins being less than a threshold number of bins.

11. The system of claim 10, wherein:
the data structure comprises an array for storing a history of distance data over time for the peak detections; and
populating the array comprises incrementing a counter for the bins based on the first peak detections from the first sensor data and second peak detections from the second peak detections.

12. The system of claim 10, wherein:
the data structure comprises a matrix with columns representing the bins and rows representing peak detections over time intervals; and
determining the number of bins containing more than the first threshold comprises summing the peak detections across the time intervals represented by the rows.

13. A method comprising:
causing a device configured to operate in a first mode and a second mode based on presence detection of a person to operate in a first mode by at least deactivating a function of the device;
while the device is operating in the first mode, generating first sensor data using a sensor of the device;
determining, based on the first sensor data and by a processing component associated with the sensor, a presence of a moving object;
outputting output data indicating that the moving object was detected;
generating second sensor data using the sensor;
determining, using the processing component, that the moving object comprises a repetitive motion object operating in proximity of the device by:
   determining an array including peaks of the first sensor data and the second sensor data;
   computing a Fourier transform of the array;
   defining limits of doppler bins corresponding to doppler energy of a presence of a person;
   determining a doppler energy spectrum ratio based on the Fourier transform of the array and the limits; and
   determining that the moving object comprises the repetitive motion object in response to the doppler energy spectrum ratio being below a threshold;
based at least in part on the moving object comprising the repetitive motion object, causing the device to operate in the first mode; and
causing the device to operate in the second mode by at least activating the function in response to determining the moving object is a person.

14. The method of claim 13, wherein the first sensor data comprises radar data and the second sensor data comprises radar data.

15. The method of claim 13, wherein determining that the moving object comprises the repetitive motion object further comprises:
determining a data structure populated with distance data over a period of time, the distance data determined based on peaks observed from the second sensor data, wherein the data structure comprises bins representing distance ranges;
populating the data structure using the second sensor data by inputting data associated with peak detections from the second sensor data in corresponding bins based on distance ranges;
determining a number of bins containing more than a first threshold for a number of peak detections; and
determining the moving object comprises the repetitive motion object based on the number of bins being below a threshold number of bins.

16. The method of claim 15, wherein:
the data structure comprises an array for storing a history of distance data over time for the peak detections; and
populating the array comprises incrementing a counter for the bins based on first peak detections from the first sensor data and second peak detections from the second peak detections.

17. The method of claim 15, wherein:
the data structure comprises a matrix with columns representing the bins and rows representing peak detections over time intervals; and
determining the number of bins containing more than the first threshold comprises summing the peak detections across the time intervals represented by the rows.

18. The method of claim 13, further comprising:
while the device is operating in the second mode, generating third sensor data using the sensor;
determining, using the processing component and based at least in part on the third sensor data, that the person is no longer located proximate to the device for a first threshold period of time; and
based at least in part on the person no longer being located proximate to the device for the first threshold period of time, causing the device to again operate in the first mode by deactivating the function.

19. The method of claim 13, further comprising
determining a set of range doppler maps over a period of time based on the first sensor data and the second sensor data; and
providing the set of range doppler maps to a machine learning classifier trained to produce an output indicative of presence of a running fan, dynamic human presence, static human presence, or no presence, and wherein determining the moving object comprises the repetitive motion object is further based on the output.

20. The method of claim 13, wherein determining the presence of the moving object comprises:
analyzing the first sensor data using a presence-detection technique by:
   analyzing, by the sensor, the first sensor data to determine a magnitude of a frequency associated with a signal;
   determining, by the sensor, a peak magnitude associated with the magnitude; and
   determining, by the sensor, that the peak magnitude satisfies a threshold magnitude; and
determining the presence of the moving object comprises detecting, by the sensor, the moving object based at least in part on the peak magnitude satisfying the threshold magnitude.

* * * * *